United States Patent
Ke et al.

(10) Patent No.: US 12,487,695 B1
(45) Date of Patent: Dec. 2, 2025

(54) TOUCH CONTROL DEVICE, TOUCH SYSTEM AND VIBRATION CONTROL METHOD THEREOF

(71) Applicant: NOVATEK Microelectronics Corp., Hsin-Chu (TW)

(72) Inventors: Chih-Yang Ke, Tainan (TW); Chin-Lin Lee, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/916,689

(22) Filed: Oct. 15, 2024

(51) Int. Cl.
  *G06F 3/041* (2006.01)
  *G06F 3/01* (2006.01)
  *G06F 3/0354* (2013.01)

(52) U.S. Cl.
  CPC .......... *G06F 3/04162* (2019.05); *G06F 3/016* (2013.01); *G06F 3/03545* (2013.01)

(58) Field of Classification Search
  CPC ............. G06F 3/04162; G06F 3/03545; G06F 3/0441; G06F 3/0442; G06F 3/016
  See application file for complete search history.

(56) References Cited

U.S. PATENT DOCUMENTS

| | | | | |
|---|---|---|---|---|
| 2014/0198069 | A1* | 7/2014 | Park | G06F 3/016 345/173 |
| 2017/0068337 | A1* | 3/2017 | Bhandari | H01G 5/12 |
| 2019/0163320 | A1 | 5/2019 | Park | |
| 2021/0124456 | A1 | 4/2021 | Wang | |
| 2022/0057870 | A1* | 2/2022 | Miyamoto | G06F 3/04162 |
| 2022/0365602 | A1* | 11/2022 | Dekel | G06F 3/03545 |
| 2023/0409128 | A1* | 12/2023 | Yoshitomi | G06F 3/041 |
| 2025/0068271 | A1* | 2/2025 | Nomura | G06F 3/0442 |

FOREIGN PATENT DOCUMENTS

| | | | |
|---|---|---|---|
| CN | 111158506 A | 5/2020 | |
| CN | 117170512 A | 12/2023 | |
| CN | 117321544 A | 12/2023 | |

* cited by examiner

*Primary Examiner* — Temesghen Ghebretinsae
*Assistant Examiner* — Ivelisse Martinez Quiles
(74) *Attorney, Agent, or Firm* — Winston Hsu (57) ABSTRACT

A touch control device, applied in a touch device with a touch panel, comprising a touch control circuit, coupled to the touch panel, and configured to determine a coordinate position of a tip section of an active stylus pen according to a tip signal from the tip section and a coordinate position of the ring section of the active stylus pen according to the ring signal from the ring section; and a processing circuit, coupled to the touch control circuit and configured to determine a usage scenario according to the coordinate position of the tip section and the coordinate position of the ring section and generate vibration strength setting information corresponding to the determined usage scenario, wherein the vibration strength setting information is provided to the active stylus pen for performing vibration operations.

21 Claims, 7 Drawing Sheets

TOUCH CONTROL DEVICE, TOUCH SYSTEM AND VIBRATION CONTROL METHOD THEREOF

BACKGROUND OF THE INVENTION

1. Field of the Invention

The present invention relates to a touch control device, touch system and vibration control method, and more particularly, to a touch control device, touch system and vibration control method for providing exquisite vibration control.

2. Description of the Prior Art

With development of man-machine interface, people starts to use an input interface of an electronic apparatus to perform pen-writing input, drawing and other actions, so various stylus pen products are available for performing input operations. The electronic apparatus may be usually equipped with a corresponding function of interacting with the stylus pen. The stylus pen may include a vibrator device to produce force to vibrate the stylus pen for providing haptic feedback for the user. However, the stylus pen typically has less memory, processor capacity, computing power than a tablet or laptop, such that the vibration strength of the vibrator cannot be delicately controlled by the stylus pen. As such, this limitation in computing power makes it difficult to provide adequate immersive vibration experience for the user. Thus, there is a need for improvement.

SUMMARY OF THE INVENTION

It is therefore an objective of the present invention to provide a touch control device, touch system and vibration control method for providing exquisite vibration control, to solve the abovementioned problem.

An embodiment of the present invention discloses a touch control device, applied in a touch system including a touch device with a touch panel and an active stylus pen, comprising: a touch control circuit, coupled to the touch panel, and configured to determine a coordinate position of a tip section of the active stylus pen according to a tip signal from the tip section and a coordinate position of a ring section of the active stylus pen according to the ring signal from the ring section; and a processing circuit, coupled to the touch control circuit and configured to determine a usage scenario according to the coordinate position of the tip section and the coordinate position of the ring section and generate vibration strength setting information corresponding to the determined usage scenario, wherein the vibration strength setting information is provided to the active stylus pen for performing vibration operations.

An embodiment of the present invention discloses a vibration control method for a touch system including a touch device and an active stylus pen, the vibration control method comprising: determining, by a touch control circuit of the touch device, a coordinate position of a tip section of the active stylus pen according to a tip signal and a coordinate position of a ring section of the active stylus pen according to the ring signal; determining, by a processing circuit of the touch device, a usage scenario according to the coordinate position of the tip section and the coordinate position of the ring section; generating, by the processing circuit, vibration strength setting information corresponding to the determined usage scenario; and providing, by the processing circuit, the vibration strength setting information to the active stylus pen for performing vibration operations.

An embodiment of the present invention discloses a touch system, comprising: an active stylus pen, comprising: a tip section, configured to send a tip signal; a ring section, configured to send a ring signal; a vibrator; and a vibration control circuit, coupled to the vibrator and configured to generate a vibration control signal to control operations of the vibrator according to vibration strength setting information; and a touch device, comprising: a touch panel; a touch control device, comprising: a touch control circuit, coupled to the touch panel, and configured to determine a coordinate position of the tip section according to the tip signal and a coordinate position of the ring section according to the ring signal; and a processing circuit, coupled to the touch control circuit and configured to determine a usage scenario according to the coordinate position of the tip section and the coordinate position of the ring section and generate the vibration strength setting information corresponding to the determined usage scenario; wherein the vibration strength setting information is provided to the vibration control circuit, and accordingly the vibration control circuit generates the vibration control signal, such that the vibrator performs the vibration operation according to the vibration control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
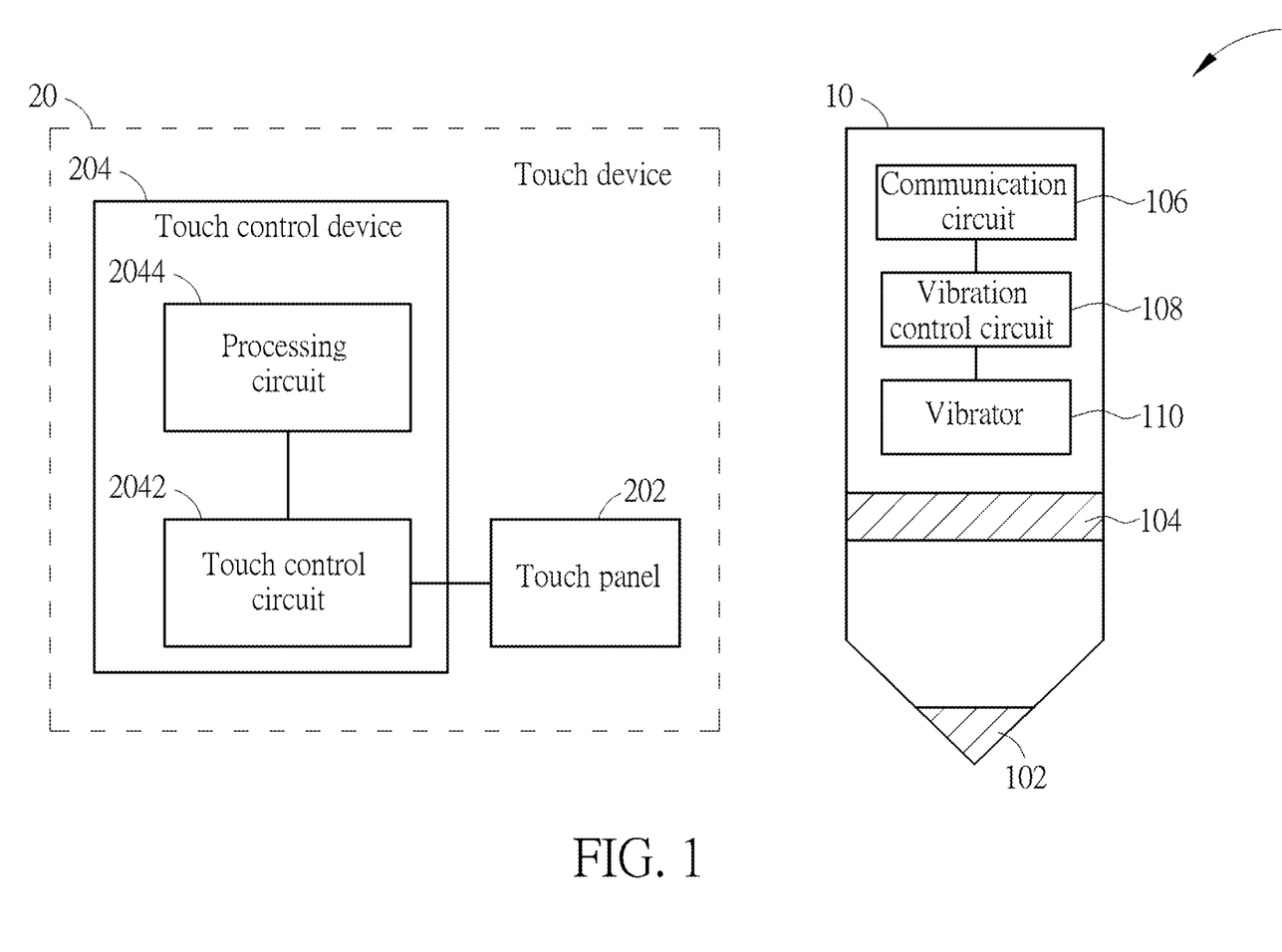
FIG. 1 is a schematic diagram of a touch system according to an embodiment of the present invention.

FIG. 1 is a schematic diagram of a touch system 1 according to an embodiment of the present invention. As shown in FIG. 1, the touch system 1 includes an active stylus pen 10 and a touch device 20. A user may use the active stylus pen 10 to interact with (e.g., to touch, to draw, or to write) a touch panel 202 of the touch device 20. The active stylus pen 10 includes a tip section 102, a ring section 104, a communication circuit 106, a vibration control circuit 108 and a vibrator 110. The tip section 102 is disposed at a tip portion of the active stylus pen 10. The tip section 102 may include a plurality of transmission electrodes. The tip section 102 is configured to transmit tip signals to the touch panel 202 via the transmission electrodes. The ring section 104 is disposed around a body of the active stylus pen 10. The ring section 104 may be near fingers of the user when the user holds the active stylus pen 10.

The ring section 104 may include a plurality of transmission electrodes. The ring section 104 is configured to transmit ring signals to the touch panel 202 via the transmission electrodes. The communication circuit 106 may include a plurality of transmission electrodes and reception electrodes. The communication circuit 106 may receive uplink signals from the touch device 20 and send downlink signals to the touch device 20. The communication circuit 106 may also be integrated with the tip section 102 and/or the ring section 104 in accordance with practical requirements.

The vibration control circuit 108 is coupled to the vibrator 110 and configured to generate a vibration control signal to control operations of the vibrator 110 according to vibration strength setting information. The vibrator 110 may be disposed at any suitable, desired location within or on the active stylus pen 10 in accordance with practical requirements. The vibrator 110 is configured to perform vibration operations according to the vibration control signal which is generated based on the vibration strength setting information. As the vibrator 110 creates forces for producing vibrating haptic outputs, a user holding the active stylus pen 10 may feel the vibrations outputted by the vibrator 110. The vibrator 110 may include vibrating actuators, haptic actuators, but not limited thereto.

The touch device 20 includes a touch panel 202 and a touch control device 204. For example, the touch device 20 may be a mobile phone, a tablet, a notebook, a desktop, a display or other electronic devices, but not limited thereto. The touch panel 202 may be controlled by the touch control device 204. The touch panel 202 may include a plurality of touch sensing electrodes, which may be integrated in or implemented on the touch panel and configured with finger touch sensing and stylus control functions.

The touch control device 204 may be implemented as an independent touch sensor chip or may be integrated with a display driver to realize a touch and display driver integration (TDDI) circuit. The touch control device 204 includes a touch control circuit 2042 and a processing circuit 2044. The touch panel 202 may be controlled by the touch control circuit 2042. The touch control circuit 2042 is coupled to the touch panel 202 for performing touch detection operations. The touch control circuit 2042 is configured to drive and control the touch panel 202 to detect touch events. The touch control circuit 2042 may be coupled to the touch sensing electrodes of the touch panel 202. The touch control circuit 2042 may detect touch positions on the touch panel 202 according to sensing signals of the touch sensing electrodes of the touch panel 202. The touch control circuit 2042 may receive downlink signals through the touch sensing electrodes of the touch panel 202. The touch control circuit 2042 may transmit uplink signals through the touch sensing electrodes of the touch panel 202. The touch control circuit 2042 may receive the tip signals of the tip section 102 and the ring signals of the ring section 104 via the touch sensing electrodes of the touch panel 202. The processing circuit 2044 is configured to determine usage scenarios according to coordinate positions of the tip section 102 and the ring section 104 and generate vibration strength setting information corresponding to the usage scenarios. The processing circuit 2044 may be a main controller or processing device, such as a central processing unit (CPU), microprocessor, or micro controller unit (MCU).

Figure 2:
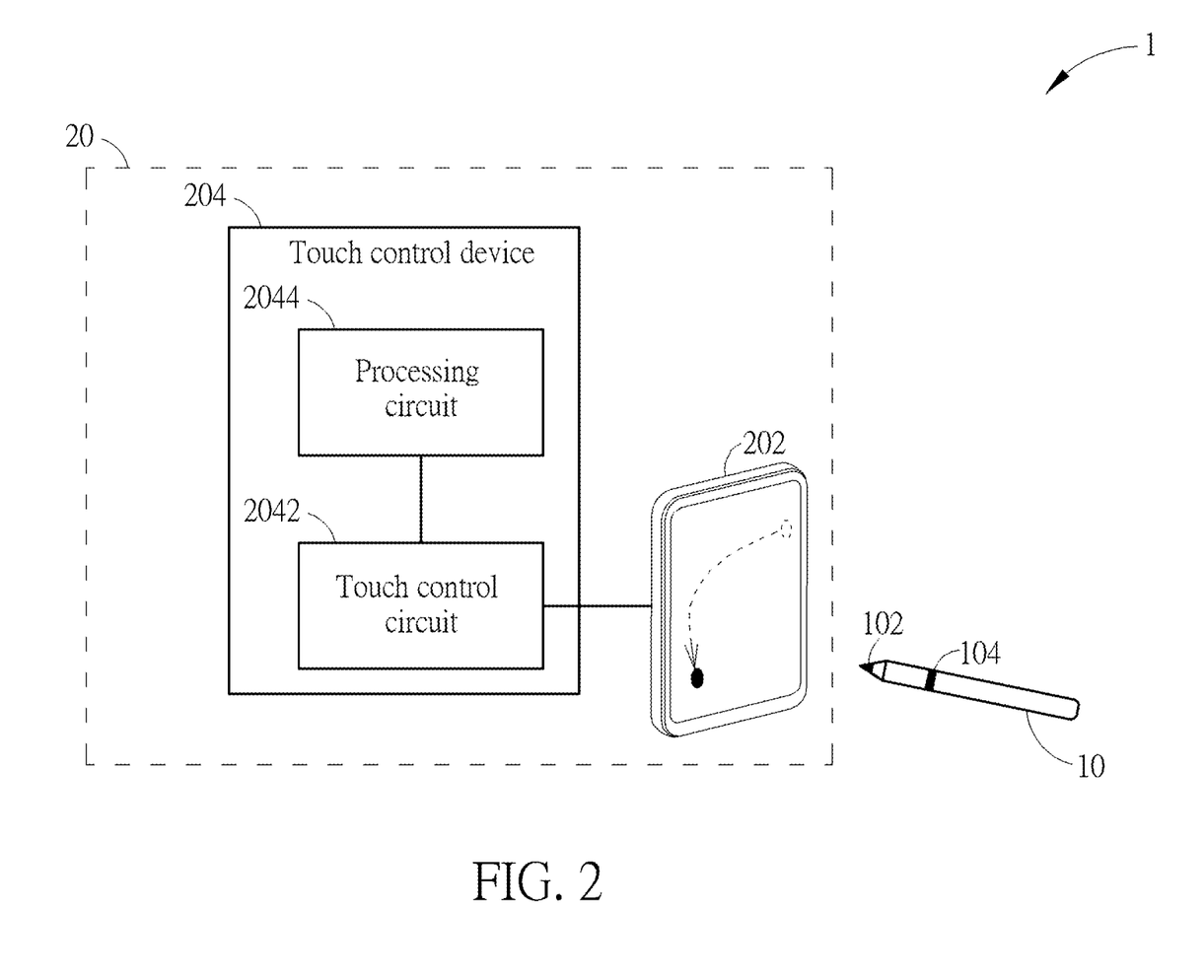
FIG. 2 is a schematic diagram illustrating interactions of the active stylus pen and the touch panel according to an embodiment of the present invention.

Please refer to FIG. 2. FIG. 2 is a schematic diagram illustrating interactions of the active stylus pen 10 and the touch panel 202 according to an embodiment of the present invention. A user may use the active stylus pen 10 to interact with (e.g., to touch, to draw, or to write) the touch panel 202. During operations, the active stylus pen 10 and the touch panel 202 may perform bi-directional communications. The touch pane 202 may send uplink signals to the active stylus pen 10 through touch sensing electrodes. The active stylus pen 10 may send downlink signals to the touch sensing electrodes of the touch panel 202 via the communication circuit 106. The bi-direction communications provide more functions and conveniences for the user.

Figure 3:
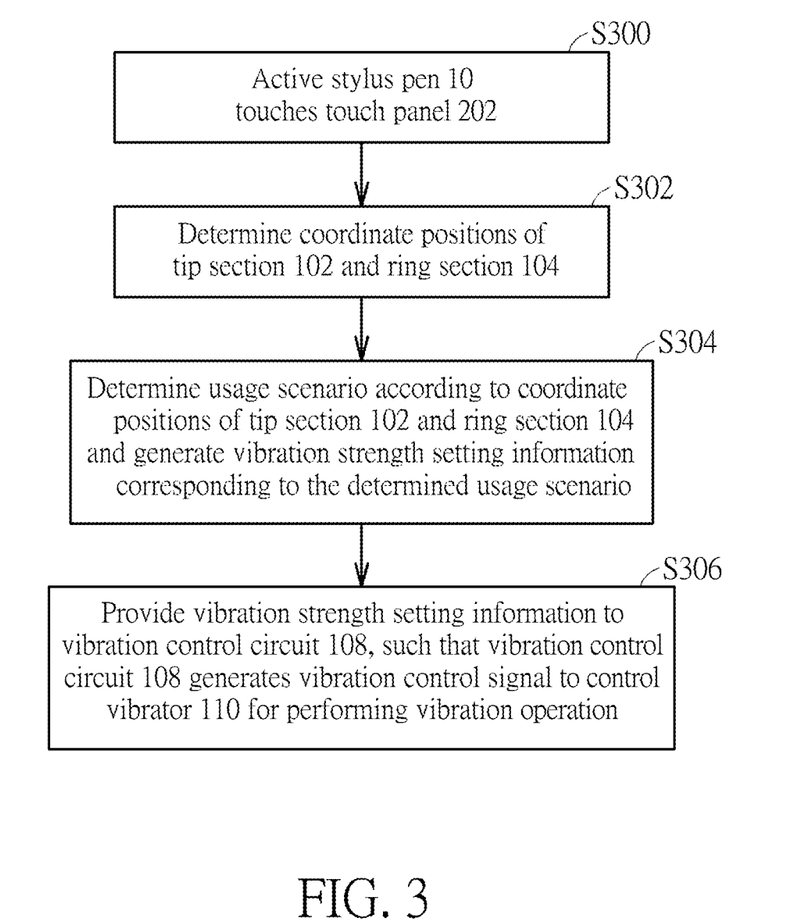
FIG. 3 is a flow diagram of a vibration control method according to an embodiment of the present invention.

For an illustration of the operations of the touch system 1, please refer to FIG. 3. FIG. 3 is a flow diagram of a vibration control method according to an embodiment of the present invention. The vibration control method of embodiments is applied to determine usage scenarios and generate corresponding vibration strength setting information for controlling the vibration operation of the vibrator 110. In Step S300, when a user uses the active stylus pen 10 to interact with the touch panel 202. The touch control circuit 2042 may detect that the active stylus pen 10 touches the touch panel 202 according to sensing signals of the touch sensing electrodes of the touch panel 202.

In Step S302, the touch control circuit 2042 may receive the tip signal of the tip section 102 and the ring signal of the ring section 104 via the touch sensing electrodes of the touch panel 202.

Figure 4:
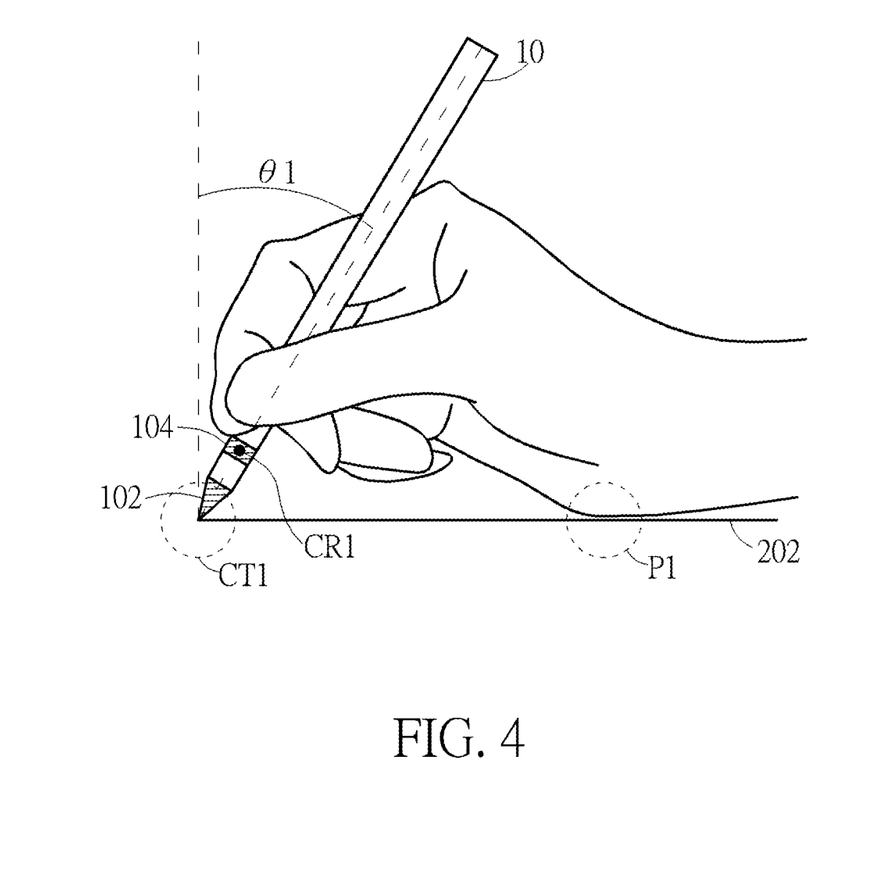
FIG. 4 is a schematic diagram illustrating operations of first pen holding mode according to an embodiment of the present invention.

The touch control circuit 2042 may calculate and determine a coordinate position of the tip section 102 according to the tip signal and a coordinate position of the ring section 104 according to the ring signal. For example, as shown in FIG. 4, a coordinate position CT1 of the tip section 102 may be determined according to the tip signal by the touch control circuit 2042. A coordinate position CR1 of the ring section 104 may be determined according to the ring signal by the touch control circuit 2042.

In Step S304, the processing circuit 2042 may determine a usage scenario according to the coordinate positions of tip section 102 and ring section 104 and generate vibration strength setting information corresponding to the determined usage scenario. For example, the usage scenario includes a pen holding scenario. The pen holding scenario includes a first pen holding mode and a second pen holding mode. The first pen holding mode indicates that the user holds the active stylus pen 10 in normal direction (e.g., hold the active stylus pen 10 in the correct way). The second pen holding mode indicates that the user holds the active stylus pen 10 in the inverse direction (e.g., hold the active stylus pen 10 in the incorrect way).

In an embodiment, the touch control circuit 2042 is configured to detect a hand position on a surface of the touch panel 202. For example, as shown in FIG. 4, a hand position P1 on a surface of the touch panel 202 is detected by the touch control circuit 2042. Moreover, the processing circuit 2044 is configured to determine the usage scenario according to the relative positions of the tip section 102, the ring section 104 of the active stylus pen 10 and the hand position. The processing circuit 2044 is configured to calculate a distance between the coordinate position of the tip section 102 and the hand position, and calculate a distance between the coordinate position of the ring section 104 and the hand position. The processing circuit 2044 may compare the distance between the coordinate position of the tip section 102 and the hand position with the distance between the coordinate position of the ring section 104 and the hand position. When determining that the distance between the coordinate position of the tip section and the hand position is greater than or equal to the distance between the coordinate position of the ring section and the hand position, the processing circuit 2044 may determine that the pen holding scenario is the first pen holding mode indicating the user holds the active stylus pen 10 in normal direction (e.g., hold the active stylus pen 10 in the correct way). As shown in FIG. 4, when determining that the distance between the coordinate position CT1 and the hand position P1 is greater than or equal to the distance between the coordinate position CR1 and the hand position P1, the processing circuit 2044 may determine that the pen holding scenario is the first pen holding mode indicating the user holds the active stylus pen 10 in normal direction.

Figure 5:
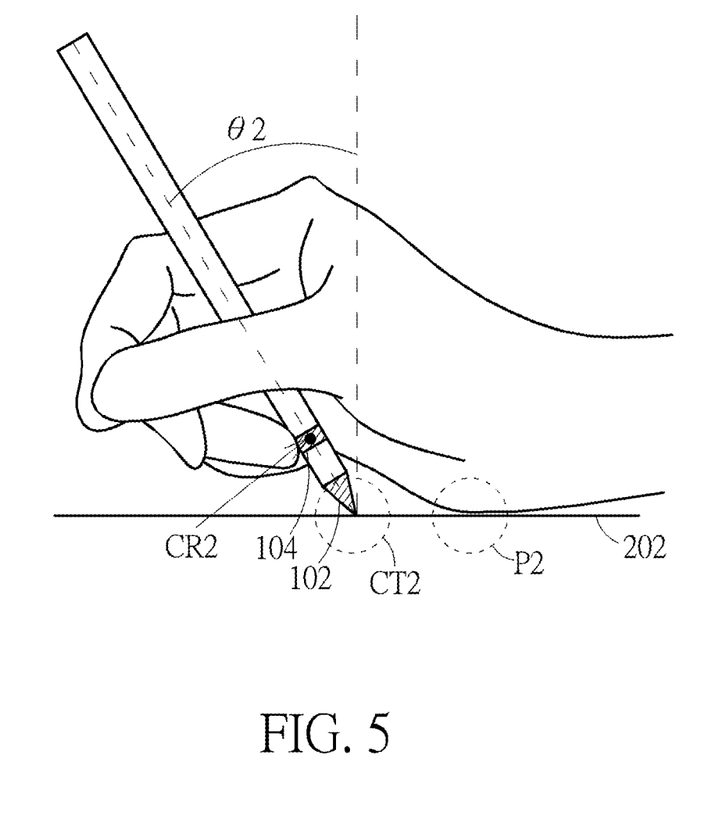
FIG. 5 is a schematic diagram illustrating operations of second pen holding mode according to an embodiment of the present invention.

When determining that the distance between the coordinate position of the tip section and the hand position is less than the distance between the coordinate position of the ring section and the hand position, the processing circuit 2044 may determine that the pen holding scenario is the second pen holding mode indicating the user holds the active stylus pen 10 in the inverse direction (e.g., hold the active stylus pen 10 in the incorrect way). For example, as shown in FIG. 5, a coordinate position CT2 of the tip section 102, a coordinate position CR1 of the ring section 104 and a hand position P2 are detected by the touch control circuit 2042. The processing circuit 2044 determines that the distance between the coordinate position CT2 and the hand position P2 is less the distance between the coordinate position CR2 and the hand position P2. As such, the processing circuit 2044 determines that the pen holding scenario is the second pen holding mode indicating the user holds the active stylus pen 10 in inverse direction.

In an alternative embodiment, the processing circuit is configured to calculate a tilt angle of the active stylus pen 10 according to the coordinate position of the tip section 102 and the coordinate position of the ring section 104. For example, as shown in FIG. 4, a tilt angle θ1 of the active stylus pen 10 is calculated by the processing circuit 2044. As shown in FIG. 5, a tilt angle θ2 of the active stylus pen 10 is calculated by the processing circuit 2044. The processing circuit 2044 is configured to determine the usage scenario according to the relative positions of the tip section 102, the ring section 104 of the active stylus pen 10 and the hand position, and the tilt angle of the active stylus pen 10. When determining that the distance between the coordinate position of the tip section and the hand position is greater than or equal to the distance between the coordinate position of the ring section and the hand position, the tip section is tilted away from the hand position based on the tilt angle and the ring section is tilted toward the hand position based on the tilt angle, the processing circuit 2044 may determine that the pen holding scenario is the first pen holding mode indicating the user holds the active stylus pen 10 in normal direction. As shown in FIG. 4, the distance between the coordinate position CT1 and the hand position P1 is greater than or equal to the distance between the coordinate position CR1 and the hand position P1. Furthermore, the tip section 102 is tilted away from the hand position P1 based on the tilt angle θ1 and the ring section 104 is tilted toward the hand position P1 based on the tilt angle θ1. As such, the processing circuit 2044 may determine that the pen holding scenario is the first pen holding mode indicating the user holds the active stylus pen 10 in normal direction.

When determining that the distance between the coordinate position of the tip section and the hand position is less than the distance between the coordinate position of the ring section and the hand position, the tip section is tilted toward the hand position based on the tilt angle and the ring section is tilted away from the hand position based on the tilt angle, the processing circuit 2044 may determine that the pen holding scenario is the second pen holding mode indicating the user holds the active stylus pen 10 in the inverse direction. For example, as shown in FIG. 5, the distance between the coordinate position CT2 and the hand position P2 is less the distance between the coordinate position CR2 and the hand position P2. The tip section 102 is tilted toward the hand position P2 based on the tilt angle θ2 and the ring section 104 is tilted away from the hand position P2 based on the tilt angle θ2. The processing circuit 2044 determines that the pen holding scenario is the second pen holding mode indicating the user holds the active stylus pen 10 in inverse direction.

Figure 6:
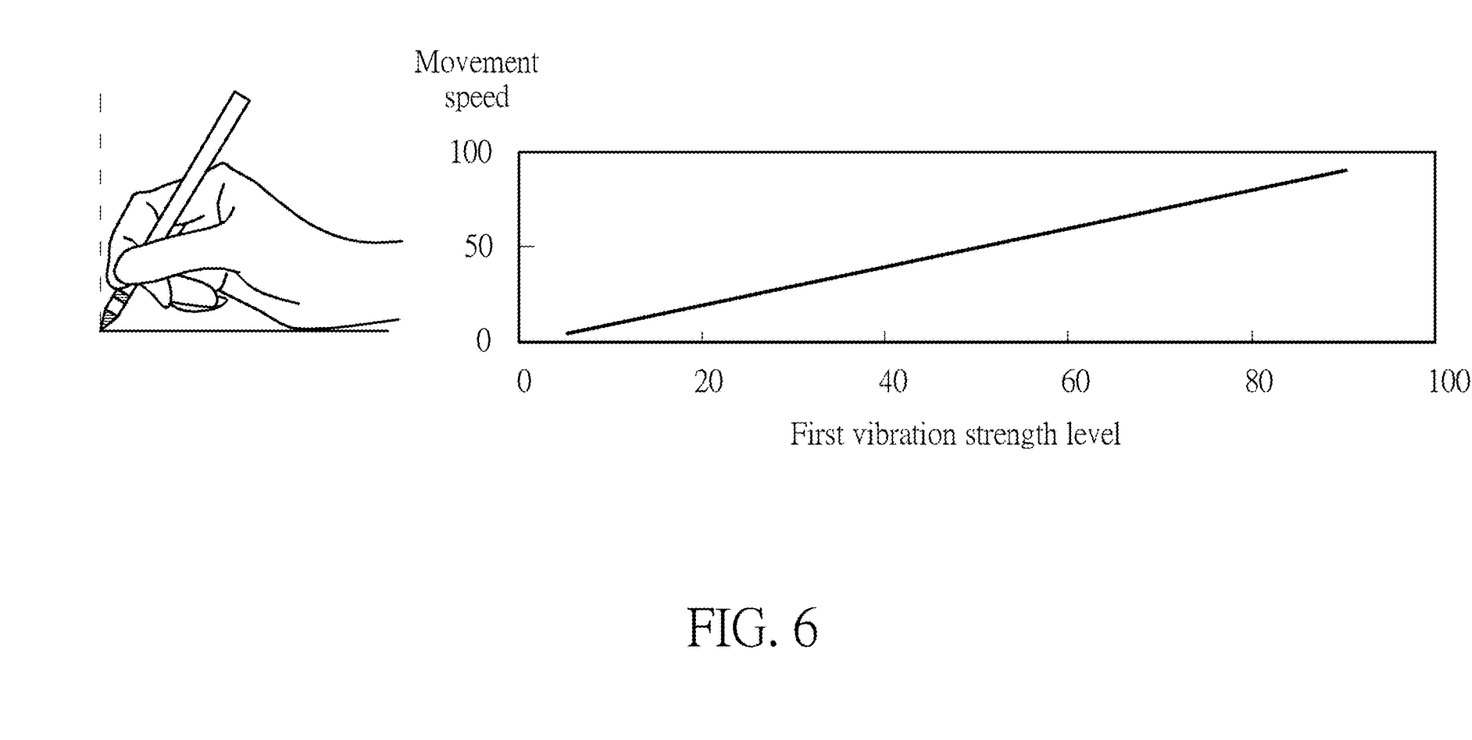
FIG. 6 is a schematic diagram illustrating the relationship of the movement speed and the first vibration strength level corresponding to the first pen holding mode according to an embodiment of the present invention.

Based on that the usage scenario is determined, the processing circuit 2044 may generate the vibration strength setting information corresponding to the determined usage scenario. The vibration strength setting information may include the vibration strength level. For example, the vibration strength setting information includes a first vibration strength level and a second vibration strength level. The processing circuit 2044 is configured to calculate a movement speed of the active stylus pen 10 according to the coordinate positions of the tip section 102 and the ring section 104. When determining that the pen holding scenario is the first pen holding mode, the processing circuit 2044 may determine the first vibration strength level corresponding to the first pen holding mode. Please refer to FIG. 6. FIG. 6 is a schematic diagram illustrating the relationship of the movement speed and the first vibration strength level corresponding to the first pen holding mode according to an embodiment of the present invention. As shown in FIG. 6, the horizontal axis represents the first vibration strength level, and the vertical axis represents the movement speed of the active stylus pen 10. The processing circuit 2044 may determine the first vibration strength level corresponding to the first pen holding mode according to the movement speed of the active stylus pen 10.

Figure 7:
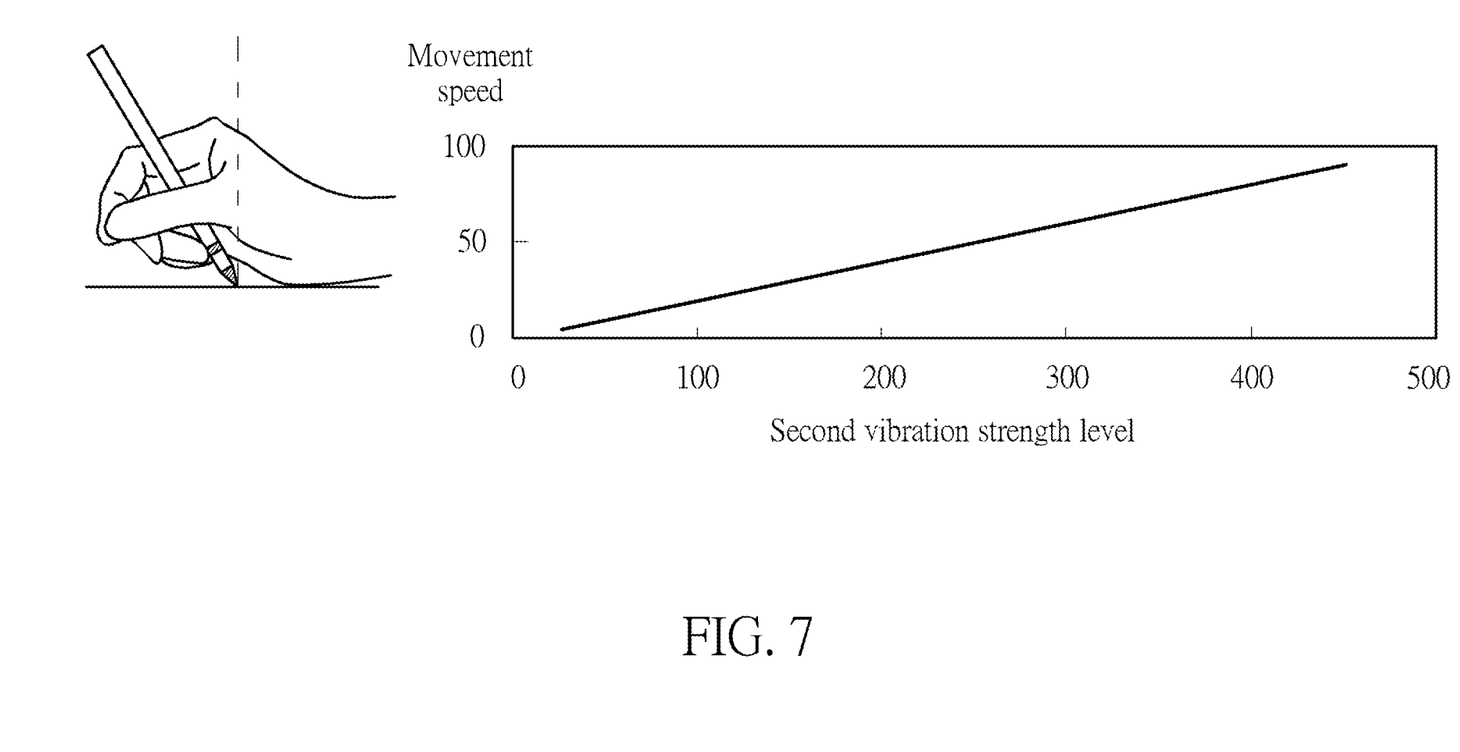
FIG. 7 is a schematic diagram illustrating the relationship of the movement speed and the second vibration strength level corresponding to the second pen holding mode according to an embodiment of the present invention.

When determining that the pen holding scenario is the second pen holding mode, the processing circuit 2044 may determine the second vibration strength level corresponding to the second pen holding mode. Please refer to FIG. 7. FIG. 7 is a schematic diagram illustrating the relationship of the movement speed and the second vibration strength level corresponding to the second pen holding mode according to an embodiment of the present invention. As shown in FIG. 7, the horizontal axis represents the second vibration strength level, and the vertical axis represents the movement speed of the active stylus pen 10. The processing circuit 2044 may determine the second vibration strength level corresponding to the second pen holding mode according to the movement speed of the active stylus pen 10. The first vibration strength level corresponding to the first pen holding mode may be less than the second vibration strength level corresponding to the second pen holding mode under the same movement speed of the active stylus pen 10. For example, please further refer to FIG. 6 and FIG. 7. As the movement speed of the active stylus pen 10 is 50 in speed unit, the first vibration strength level is 50 and the second vibration strength level is 250. Therefore, the first vibration strength level (50) corresponding to the first pen holding mode is less than the second vibration strength level (250)

corresponding to the second pen holding mode under the same movement speed of the active stylus pen 10.

The vibration strength setting information may include a ratio of the movement speed of the active stylus pen 10 to the vibration strength level corresponding to various pen holding modes. For example, when determining that the pen holding scenario is the first pen holding mode, the processing circuit 2044 may determine a ratio of the movement speed of the active stylus pen 10 to the first vibration strength level corresponding to the first pen holding mode. When determining that the pen holding scenario is the second pen holding mode, the processing circuit 2044 may determine a ratio of the movement speed of the active stylus pen 10 to the second vibration strength level corresponding to the second pen holding mode. The ratio of the movement speed of the active stylus pen 10 to the first vibration strength level corresponding to the first pen holding mode is greater than the ratio of the movement speed of the active stylus pen 10 to the second vibration strength level corresponding to the second pen holding mode. For example, please further refer to FIG. 6 and FIG. 7. The processing circuit 2044 may determine that the ratio of the movement speed of the active stylus pen 10 to the first vibration strength level corresponding to the first pen holding mode is 1 (e.g., 50/50=1). The processing circuit 2044 may determine that the ratio of the movement speed of the active stylus pen 10 to the second vibration strength level corresponding to the second pen holding mode is 0.2 (e.g., 50/250=0.2). The ratio (e.g., 1) of the movement speed to the first vibration strength level is greater than the ratio (e.g., 0.2) of the movement speed of the active stylus pen 10 to the second vibration strength level.

In other words, under the first pen holding mode, the user holds the active stylus pen 10 in normal direction, such that the user may operate the active stylus pen 10 smoothly and easily for writing. The first vibration strength level may be set weaker to simulate smaller resistance. Under the second pen holding mode, the user holds the active stylus pen 10 in the inverse direction, such that the user may operate the active stylus pen 10 stiffly and laboriously for writing. The second vibration strength level may be set stronger to simulate larger resistance. Therefore, the embodiments of the present invention may determine the usage scenario according to the relative positions of active stylus pen 10 and thus provide appropriate vibration strength setting information for various usage scenarios.

In Step S306, the vibration strength setting information corresponding to the determined usage scenario may be provided to the vibration control circuit 108, and the vibration control circuit 108 may generate the vibration control signal according to the vibration strength setting information. As such, the vibrator 110 performs the vibration operation according to the vibration control signal. In an embodiment, the vibration strength setting information may be send to the vibration control circuit 108 via the uplink signal. The processing circuit 2044 may provide the determined vibration strength setting information to the touch control circuit 2042. The vibration strength setting information may be included in the uplink signal. The touch control circuit 2042 may send the uplink signal with the vibration strength setting information to the active stylus pen 10 through touch sensing electrodes. The communication circuit 106 of the active stylus pen 10 may receive the uplink signal with the vibration strength setting information and decode the downlink signals to obtain the vibration strength setting information carried in the downlink signal. The communication circuit 106 may provide the vibration strength setting information to the vibrator 110 for following operations.

In an embodiment, the active stylus pen 10 further includes a first wireless communication interface circuit (not shown in figures) and the touch device 20 further includes a second wireless communication interface circuit (not shown in figures). The vibration strength setting information may be send from the touch device 20 to the active stylus pen 10 via the first wireless communication interface circuit and the second wireless communication interface circuit. The processing circuit 2044 may provide the determined vibration strength setting information to the second wireless communication interface circuit of the touch device 20. The second wireless communication interface circuit of the touch device 20 may transmit the vibration strength setting information to the first wireless communication interface circuit of the active stylus pen 10 through wireless communications. The first wireless communication interface circuit of the active stylus pen 10 and the second wireless communication interface circuit of the touch device 20 may utilize the wireless transmission technologies such as the Bluetooth, Wi-Fi, infra-red ray or Radio Frequency Identification (RFID) to communicate with each other the audio processing circuit 106 for transmitting signals, but not limited thereto.

In Step S304, the processing circuit 2044 may determine the usage scenario according to a surface frictional coefficient of the touch panel 202. The usage scenario comprises a surface frictional coefficient of the touch panel 202. The surface frictional coefficient of the touch panel 202 may be preset and recorded into the default configuration settings of the touch panel 202 during manufacturing process. The processing circuit 2044 may read and analysis the default configuration settings of the touch panel 202 to determine the surface frictional coefficient of the touch panel 202. When determining that the surface frictional coefficient of the touch panel 202 is less than a frictional coefficient threshold, this means that the touch panel 202 may be a smooth touch panel. The processing circuit 2044 may determine a first vibration strength level corresponding to the first usage scenario. When determining that the surface frictional coefficient of the touch panel 202 is greater than or equal to a frictional coefficient threshold, this means that the touch panel 202 may be a paper-like touch panel. The processing circuit 2044 may determine a second vibration strength level corresponding to the second usage scenario, and the first vibration strength level corresponding to the first usage scenario is less than the second vibration strength level corresponding to the second usage scenario.

Moreover, the processing circuit may determine a ratio of the movement speed of the active stylus pen 10 to the first vibration strength level corresponding to the first usage scenario when determining that the usage scenario is the first usage scenario. The processing circuit may determine a ratio of the movement speed of the active stylus pen 10 to the second vibration strength level corresponding to the second usage scenario when determining that the usage scenario is the second usage scenario. The ratio of the movement speed of the active stylus pen 10 to the first vibration strength level corresponding to the first usage scenario is greater than the ratio of the movement speed of the active stylus pen 10 to the second vibration strength level corresponding to the second usage scenario. Therefore, while applied to the smooth touch panel, the first vibration strength level may be set weaker to simulate smaller resistance, such that the user may experience smooth writing feedback when writing on the touch panel 202. While applied to the paper-like touch panel, the second vibration strength level may be set stronger to simulate larger resistance, such that the user may experience slight rough writing feedback when writing on the touch panel 202. The embodiments of the present invention may determine the usage scenario according to the surface frictional coefficient of the touch panel and thus provide appropriate vibration strength setting information for various usage scenarios.

To sum up, the embodiments of the present invention may determine the usage scenario according to the relative positions and tilt angle of the active stylus pen 10 and accordingly provide appropriate vibration strength setting information for various usage scenarios, so as to provide more delicate vibration control for excellent haptic feedback and also allow the user to experience the realistic and precise writing interaction during using the active stylus pen.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch control device, applied in a touch system including a touch device with a touch panel and an active stylus pen, comprising:
   a touch control circuit, coupled to the touch panel, and configured to determine a coordinate position of a tip section of the active stylus pen according to a tip signal from the tip section and a coordinate position of a ring section of the active stylus pen according to a ring signal from the ring section; and
   a processing circuit, coupled to the touch control circuit and configured to determine a usage scenario according to the coordinate position of the tip section and the coordinate position of the ring section and generate vibration strength setting information corresponding to the determined usage scenario, wherein the vibration strength setting information is provided to the active stylus pen for performing vibration operations;
   wherein the usage scenario comprises a pen holding scenario, and the pen holding scenario comprises a first pen holding mode and a second pen holding mode, the touch control circuit is configured to detect a hand position on a surface of the touch panel, the processing circuit is configured to determine that the pen holding scenario is the first pen holding mode when determining that a distance between the coordinate position of the tip section and the hand position is greater than or equal to a distance between the coordinate position of the ring section and the hand position, and the processing circuit is configured to determine that the pen holding scenario is the second pen holding mode when determining that the distance between the coordinate position of the tip section and the hand position is less than the distance between the coordinate position of the ring section and the hand position.

2. The touch control device of claim 1, wherein the processing circuit is configured to calculate a tilt angle of the active stylus pen according to the coordinate position of the tip section and the coordinate position of the ring section, the processing circuit is configured to determine that the pen holding scenario is the first pen holding mode when determining that the distance between the coordinate position of the tip section and the hand position is greater than or equal to the distance between the coordinate position of the ring section and the hand position, the tip section is tilted away from the hand position based on the tilt angle and the ring section is tilted toward the hand position based on the tilt angle, and the processing circuit is configured to determine that the pen holding scenario is the second pen holding mode when determining that the distance between the coordinate position of the tip section and the hand position is less than the distance between the coordinate position of the ring section and the hand position, the tip section is tilted toward the hand position based on the tilt angle and the ring section is tilted away from the hand position based on the tilt angle.

3. The touch control device of claim 1, wherein the vibration strength setting information comprises a first vibration strength level and a second vibration strength level, the processing circuit is configured to determine the first vibration strength level corresponding to the first pen holding mode when determining that the pen holding scenario is the first pen holding mode, and the processing circuit is configured to determine the second vibration strength level corresponding to the second pen holding mode when determining that the pen holding scenario is the second pen holding mode, wherein the first vibration strength level corresponding to the first pen holding mode is less than the second vibration strength level corresponding to the second pen holding mode.

4. The touch control device of claim 3, wherein the processing circuit is configured to calculate a movement speed of the active stylus pen according to the coordinate position of the tip section and the coordinate position of the ring section, the processing circuit is configured to determine a ratio of the movement speed of the active stylus pen to the first vibration strength level corresponding to the first pen holding mode when determining that the pen holding scenario is the first pen holding mode, and the processing circuit is configured to determine a ratio of the movement speed of the active stylus pen to the second vibration strength level corresponding to the second pen holding mode when determining that the pen holding scenario is the second pen holding mode, wherein the ratio of the movement speed of the active stylus pen to the first vibration strength level corresponding to the first pen holding mode is greater than the ratio of the movement speed of the active stylus pen to the second vibration strength level corresponding to the second pen holding mode.

5. The touch control device of claim 1, wherein the touch control device is configured to send the vibration strength setting information to the active stylus pen via an uplink signal or a wireless communication interface circuit.

6. The touch control device of claim 1, wherein the usage scenario comprises a surface frictional coefficient of the touch panel, the processing circuit is configured to determine that the usage scenario is a first usage scenario when determining that the surface frictional coefficient of the touch panel is less than a frictional coefficient threshold and accordingly determine a first vibration strength level corresponding to the first usage scenario, and the processing circuit is configured to determine that the usage scenario is a second usage scenario when determining that the surface frictional coefficient of the touch panel is greater than or equal to the frictional coefficient threshold and accordingly determine a second vibration strength level corresponding to the second usage scenario, wherein the first vibration strength level corresponding to the first usage scenario is less than the second vibration strength level corresponding to the second usage scenario.

7. The touch control device of claim 6, wherein the processing circuit is configured to calculate a movement speed of the active stylus pen according to the coordinate position of the tip section and the coordinate position of the ring section, the processing circuit is configured to determine a ratio of the movement speed of the active stylus pen to the first vibration strength level corresponding to the first usage scenario when determining that the usage scenario is the first usage scenario, the processing circuit is configured to determine a ratio of the movement speed of the active stylus pen to the second vibration strength level corresponding to the second usage scenario when determining that the usage scenario is the second usage scenario, wherein the ratio of the movement speed of the active stylus pen to the first vibration strength level corresponding to the first usage scenario is greater than the ratio of the movement speed of the active stylus pen to the second vibration strength level corresponding to the second usage scenario.

8. A vibration control method for a touch system including a touch device and an active stylus pen, the vibration control method comprising:
  determining, by a touch control circuit of the touch device, a coordinate position of a tip section of the active stylus pen according to a tip signal and a coordinate position of a ring section of the active stylus pen according to a ring signal;
  detecting, by the touch control circuit, a hand position on a surface of the touch device;
  determining, by a processing circuit of the touch device, a usage scenario according to the coordinate position of the tip section and the coordinate position of the ring section, wherein the usage scenario comprises a pen holding scenario, and the pen holding scenario comprises a first pen holding mode and a second pen holding mode, wherein the vibration control method further comprises:
    determining, by the processing circuit, that the pen holding scenario is the first pen holding mode when determining that a distance between the coordinate position of the tip section and the hand position is greater than or equal to a distance between the coordinate position of the ring section and the hand position; and
    determining, by the processing circuit, that the pen holding scenario is the second pen holding mode when determining that the distance between the coordinate position of the tip section and the hand position is less than the distance between the coordinate position of the ring section and the hand position;
  generating, by the processing circuit, vibration strength setting information corresponding to the determined usage scenario; and
  providing, by the processing circuit, the vibration strength setting information to the active stylus pen for performing vibration operations.

9. The vibration control method of claim 8, the vibration control method further comprising:
  calculating, by the touch control circuit, a tilt angle of the active stylus pen according to the coordinate position of the tip section and the coordinate position of the ring section;
  determining, by the processing circuit, that the pen holding scenario is the first pen holding mode when determining that the distance between the coordinate position of the tip section and the hand position is greater than or equal to the distance between the coordinate position of the ring section and the hand position, the tip section is tilted away from the hand position based on the tilt angle and the ring section is tilted toward the hand position based on the tilt angle; and
  determining, by the processing circuit, that the pen holding scenario is the second pen holding mode when determining that the distance between the coordinate position of the tip section and the hand position is less than the distance between the coordinate position of the ring section and the hand position, the tip section is tilted toward the hand position based on the tilt angle and the ring section is tilted away from the hand position based on the tilt angle.

10. The vibration control method of claim 8, wherein the vibration strength setting information comprises a first vibration strength level and a second vibration strength level, the vibration control method further comprising:
  determining, by the processing circuit, the first vibration strength level corresponding to the first pen holding mode when determining that the pen holding scenario is the first pen holding mode; and
  determining, by the processing circuit, the second vibration strength level corresponding to the second pen holding mode when determining that the pen holding scenario is the second pen holding mode;
  wherein the first vibration strength level corresponding to the first pen holding mode is less than the second vibration strength level corresponding to the second pen holding mode.

11. The vibration control method of claim 10, further comprising:
  calculating, by the processing circuit, a movement speed of the active stylus pen according to the coordinate position of the tip section and the coordinate position of the ring section;
  determining, by the processing circuit, a ratio of the movement speed of the active stylus pen to the first vibration strength level corresponding to the first pen holding mode when determining that the pen holding scenario is the first pen holding mode; and
  determining, by the processing circuit, a ratio of the movement speed of the active stylus pen to the second vibration strength level corresponding to the second pen holding mode when determining that the pen holding scenario is the second pen holding mode;
  wherein the ratio of the movement speed of the active stylus pen to the first vibration strength level corresponding to the first pen holding mode is greater than the ratio of the movement speed of the active stylus pen to the second vibration strength level corresponding to the second pen holding mode.

12. The vibration control method of claim 8, further comprising:
  sending, by the touch control circuit, the vibration strength setting information to the active stylus pen via an uplink signal or a wireless communication interface circuit.

13. The vibration control method of claim 8, wherein the usage scenario comprises a surface frictional coefficient of the touch device, and the vibration control method further comprising:
  determining, by the processing circuit, that the usage scenario is a first usage scenario when determining that the surface frictional coefficient of the touch device is less than a frictional coefficient threshold and accordingly determining a first vibration strength level corresponding to the first usage scenario; and
  determining, by the processing circuit, that the usage scenario is a second usage scenario when determining that the surface frictional coefficient of the touch device is greater than or equal to the frictional coefficient threshold and accordingly determining a second vibration strength level corresponding to the second usage scenario;

wherein the first vibration strength level corresponding to the first usage scenario is less than the second vibration strength level corresponding to the second usage scenario.

14. The vibration control method of claim 13, further comprising:

calculating, by the processing circuit, a movement speed of the active stylus pen according to the coordinate position of the tip section and the coordinate position of the ring section;

determining, by the processing circuit, a ratio of the movement speed of the active stylus pen to the first vibration strength level corresponding to the first usage scenario when determining that the usage scenario is the first usage scenario; and determining, by the processing circuit, a ratio of the movement speed of the active stylus pen to the second vibration strength level corresponding to the second usage scenario when determining that the usage scenario is the second usage scenario;

wherein the ratio of the movement speed of the active stylus pen to the first vibration strength level corresponding to the first usage scenario is greater than the ratio of the movement speed of the active stylus pen to the second vibration strength level corresponding to the second usage scenario.

15. A touch system, comprising:

an active stylus pen, comprising:
- a tip section, configured to send a tip signal;
- a ring section, configured to send a ring signal;
- a vibrator; and
- a vibration control circuit, coupled to the vibrator and configured to generate a vibration control signal to control operations of the vibrator according to vibration strength setting information; and a touch device, comprising:
- a touch panel;
- a touch control device, comprising:
  - a touch control circuit, coupled to the touch panel, and configured to determine a coordinate position of the tip section according to the tip signal and a coordinate position of the ring section according to the ring signal; and
  - a processing circuit, coupled to the touch control circuit and configured to determine a usage scenario according to the coordinate position of the tip section and the coordinate position of the ring section and generate the vibration strength setting information corresponding to the determined usage scenario;
  - wherein the vibration strength setting information is provided to the vibration control circuit, and accordingly the vibration control circuit generates the vibration control signal, such that the vibrator performs the vibration operation according to the vibration control signal,
  - wherein the usage scenario comprises a pen holding scenario, and the pen holding scenario comprises a first pen holding mode and a second pen holding mode, the touch control circuit is configured to detect a hand position on a surface of the touch panel, the processing circuit is configured to determine that the pen holding scenario is the first pen holding mode when determining that a distance between the coordinate position of the tip section and the hand position is greater than or equal to a distance between the coordinate position of the ring section and the hand position, and the processing circuit is configured to determine that the pen holding scenario is the second pen holding mode when determining that the distance between the coordinate position of the tip section and the hand position is less than the distance between the coordinate position of the ring section and the hand position.

16. The touch system of claim 15, wherein the processing circuit is configured to calculate a tilt angle of the active stylus pen according to the coordinate position of the tip section and the coordinate position of the ring section, the processing circuit is configured to determine that the pen holding scenario is the first pen holding mode when determining that the distance between the coordinate position of the tip section and the hand position is greater than or equal to the distance between the coordinate position of the ring section and the hand position, the tip section is tilted away from the hand position based on the tilt angle and the ring section is tilted toward the hand position based on the tilt angle, and the processing circuit is configured to determine that the pen holding scenario is the second pen holding mode when determining that the distance between the coordinate position of the tip section and the hand position is less than the distance between the coordinate position of the ring section and the hand position, the tip section is tilted toward the hand position based on the tilt angle and the ring section is tilted away from the hand position based on the tilt angle.

17. The touch system of claim 15, wherein the vibration strength setting information comprises a first vibration strength level and a second vibration strength level, the processing circuit is configured to determine the first vibration strength level corresponding to the first pen holding mode when determining that the pen holding scenario is the first pen holding mode, and the processing circuit is configured to determine the second vibration strength level corresponding to the second pen holding mode when determining that the pen holding scenario is the second pen holding mode, wherein the first vibration strength level corresponding to the first pen holding mode is less than the second vibration strength level corresponding to the second pen holding mode.

18. The touch system of claim 17, wherein the processing circuit is configured to calculate a movement speed of the active stylus pen according to the coordinate position of the tip section and the coordinate position of the ring section, the processing circuit is configured to determine a ratio of the movement speed of the active stylus pen to the first vibration strength level corresponding to the first pen holding mode when determining that the pen holding scenario is the first pen holding mode, and the processing circuit is configured to determine a ratio of the movement speed of the active stylus pen to the second vibration strength level corresponding to the second pen holding mode when determining that the pen holding scenario is the second pen holding mode, wherein the ratio of the movement speed of the active stylus pen to the first vibration strength level corresponding to the first pen holding mode is greater than the ratio of the movement speed of the active stylus pen to the second vibration strength level corresponding to the second pen holding mode.

19. The touch system of claim 15, wherein the touch control device is configured to send the vibration strength setting information to the active stylus pen via a uplink signal or a wireless communication interface circuit.

20. The touch system of claim 15, wherein the usage scenario comprises a surface frictional coefficient of the touch panel, the processing circuit is configured to determine that the usage scenario is a first usage scenario when determining that the surface frictional coefficient of the touch panel is less than a frictional coefficient threshold and accordingly determine a first vibration strength level corresponding to the first usage scenario, and the processing circuit is configured to determine that the usage scenario is a second usage scenario when determining that the surface frictional coefficient of the touch panel is greater than or equal to the frictional coefficient threshold and accordingly determine a second vibration strength level corresponding to the second usage scenario, wherein the first vibration strength level corresponding to the first usage scenario is less than the second vibration strength level corresponding to the second usage scenario.

21. The touch system of claim 20, wherein the processing circuit is configured to calculate a movement speed of the active stylus pen according to the coordinate position of the tip section and the coordinate position of the ring section, the processing circuit is configured to determine a ratio of the movement speed of the active stylus pen to the first vibration strength level corresponding to the first usage scenario when determining that the usage scenario is the first usage scenario, the processing circuit is configured to determine a ratio of the movement speed of the active stylus pen to the second vibration strength level corresponding to the second usage scenario when determining that the usage scenario is the second usage scenario, wherein the ratio of the movement speed of the active stylus pen to the first vibration strength level corresponding to the first usage scenario is greater than the ratio of the movement speed of the active stylus pen to the second vibration strength level corresponding to the second usage scenario.

* * * * *